3,136,787
NEW SULFONAMIDES
Hans Ulrich Daeniker, Basel, Switzerland, assignor to Ciba Corporation, a corporation of Delaware
No Drawing. Filed May 23, 1961, Ser. No. 111,921
Claims priority, application Switzerland May 25, 1960
12 Claims. (Cl. 260—348)

The present invention provides a process for the manufacture of new 1:4-endoalkylene-cyclohexane-2-sulfonamides in which the endoalkylene group is a methylene or ethylene group, and salts thereof, that is to say of sulfonamides containing the nucleus of the formula

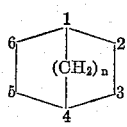

—in which $n=1$ or 2—and salts thereof. The new compounds may be further substituted, more especially at the nitrogen atom of the sulfonamide group, by lower aliphatic, cycloaliphatic or arylaliphatic substituents, or which atom may also be acylated. Preferably, the nitrogen atom of the sulfonamide group is unsubstituted or substituted by a hydrocarbon radical, more especially by one or two lower alkyl groups, for example methyl, ethyl, propyl, isopropyl, butyl, isobutyl, pentyl or cycloalkyl groups such as cyclohexyl or bicyclo(2:2:1)-heptyl-methyl, or there may be attached to it an alkylene chain such as pentamethylene, or arylaliphatic radicals such as β-phenylethyl or it may be acylated, for example by a lower alkanoic acid radical such as acetyl, by an aromatic acid radical such as benzoyl, or by a carbamic acid radial such as the N-n-butylcarbamic acid radical.

The new compounds may also be further substituted, for example in the ring position 3, for example by a lower alkyl group such as methyl, or aryl, for example phenyl, and/or in positions 5 and/or 6 by oxygen functions, for example by a 5,6-epoxy-group.

The substitutents attached to the 1:4-endoalkylene-cyclohexane system especially the sulfonamide group in position 2, may be of the endo-configuration or the exo-configuration.

The new compounds defined above possess valuable pharmacological properties and are therefore intended to be used as medicaments or as intermediates for the manufacture thereof. Inter alia they have an exciting effect on the central nervous system.

In particular, compounds of the formula

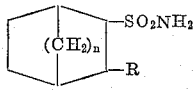

—in which $n=1$ or 2 and R represents a hydrogen atom or a methyl group—have an analeptic effect and can be used as analeptics.

To obtain the new compounds a 1:4-endoalkylene-cyclohexane-2-sulfonamide in which the endoalkylene group is a methylene or ethylene group or salt thereof is manufactured in the known manner For example, the new compounds are obtained by converting into an amide a 1:4-endoalkylene-cyclohexane-2-sulfonyl halide, particularly fluoride or chloride, whose endoalkylene group is the methylene or ethylene group and which, depending on the character of the final products, may contain further substitutents, and, if desired, further substituting a resulting sulfonamide derivative at the nitrogen atom and/or preparing salts and/or, if desired, resolving a resulting mixture of isomers into its constituents.

The present process can be represented, for example, by the following formulae:

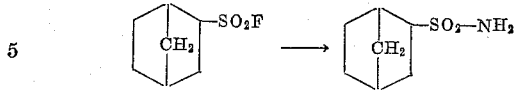

Another method for the preparation of the new compounds defined above consists in saturating, preferably with hydrogen or by epoxylation, the double bond of a 1:4-endoalkylene-$\Delta^5$-cyclohexene-2 - sulfonamide, whose endoalkylene group is the methylene or ethylene group and which, depending on the character of the final products, may also be further substituted, and if desired, in further substituting a resulting sulfonamide derivative at the nitrogen atom of the sulfonamide group, and/or in preparing salts, and/or in resolving any mixture of isomers obtained into its constituents.

The process may be represented, for example, by the following formulae:

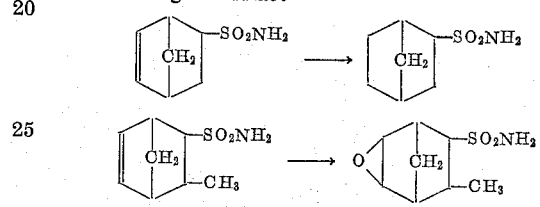

The manufacture of the above-defined amides from corresponding halides follows the usual practice. Thus, for example, a sulfonyl halide derivative can be reacted with ammonia or an amine—undiluted or diluted with an inert solvent—in the presence or absence of a basic condensing agent. A sulfonyl fluoride derivative is preferably mixed with an excess of liquid ammonia or with an amine such, for example, as a lower alkylamine or dilower alkylamine, and the reaction mixture is heated in a closed tube to 80–150° C., if desired in the presence of a reaction accelerator such as ammonium chloride or an amine hydrochloride. Sulfonyl chloride derivatives are considerably easier to react with amines; the free amide is obtained, for example, by adding the sulfonyl chloride dropwise to liquid ammonia, or by introducing ammonia gas into the solution of the compound in an inert solvent.

A resulting sulfonamide derivative can be further substituted, if necessary, at the nitrogen atom. More especially, a sulfonamide derivative, capable of forming salts with bases, can be reacted with an electrophilic reagent. Electrophilic reagents are, for example, reactive esters of alcohols such as halides. For example: By reacting the sodium salt of 1:4 - endomethylene-cyclohexane-2-sulfonamide with methiodide the corresponding monomethylamide is obtained.

Furthermore, there may be mentioned the reaction with a reactive carboxylic acid derivative, such as a halide, anhydride or isocyanate, in the presence of a basic catalyst to form an N-acyl derivative. The reaction of 1:4-endomethylene-cyclohexane-2-sulfonic acid amide with acetic anhydride in the presence of pyridine leads, for example, to the corresponding N-acetyl derivative.

As salts there may be mentioned those of sulfonamide derivatives whose nitrogen atom carries a free hydrogen atom which can be exchanged for a cation, for example the cation of an alkali metal, for example, sodium. More especially the corresponding N-acyl derivatives form stable salts which are soluble in water with a neutral pH.

The separation of a mixture of isomers obtained at any stage of the process into its constituents is carried out by a known method, more especially by fractional crystallization, liquid-liquid distribution, fractional elution chromatography on solid adsorbents or by gas chromatography. The separation will especially aim at the isolation of the endo-isomers and exo-isomers such as may occur in these cyclic systems, for example by the free or functionally converted sulfonic acid groups in position 2 and whose formulae may, for example, be as follows:

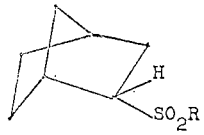   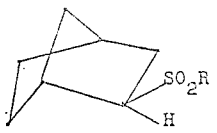

Endo                    Exo

A double bond present is preferably saturated with hydrogen, particularly with catalytically activated hydrogen; suitable catalysts are precious metals with or without vehicle, for example palladium carbon or nickel.

Double bonds present may also be saturated by substituents; for example, they can be epoxylated by a known method whereupon the resulting epoxide can, if desired, be further reacted in the known manner. Epoxylation is performed, for example, with monoperphthalic acid in ether.

The starting materials are known or can be made by known methods. It is of advantage to use starting materials that give rise to the compounds described above as being specially preferred.

For example, the 1:4-endoalkylene-cyclohexane-2-sulfonyl halides mentioned as starting materials are obtained by condensing a cycloalkadiene with the nucleus of the formula

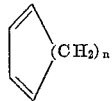

in which $n$ stands for 1 or 2, with an $\alpha:\beta$-unsaturated organic sulfonyl halide, more especially fluoride or chloride, and in a resulting condensation product saturating the carbon-to-carbon double bond with hydrogen. As $\alpha:\beta$-unsaturated organic sulfonyl halides there may be mentioned $\Delta^1$-alkene-sulfonyl halides, more especially vinylsulfonyl fluoride, vinylsulfonyl chloride, and $\Delta^1$-propene-sulfonyl chloride, furthermore $\beta$-styrylsulfonyl halides, as for example $\beta$-styryl-sulfonyl chloride. The saturation of the carbon-to-carbon double bond is performed preferably with catalytically activated hydrogen, for example with hydrogen in the presence of palladium carbon.

The 1:4-endoalkylene-cyclohexane-2-sulfonyl halides used as starting materials can alternatively be made by known methods from other compounds free from sulfur of the 1:4-endoalkylene-cyclohexane series. Thus, for example a free or functionally converted sulfonic acid radical can be introduced in position 2 of norbornylene directly or stepwise and, if desired, a resulting compound convertible into a halide may be so converted. The direct introduction of a sulfonic acid radical can be performed, for example, by an additive reaction of sodium bisulfite with norbornylene, whereupon the resulting sodium salt of 1:4 endomethylene-cyclo-hexane-2-sulfonic acid is converted into the corresponding acid halide. Indirectly, for example thioacetic acid may be added on to norbornylene, the resulting thio-norborneol acetate may be hydrolysed and the resulting free mercapto oxidized with halogen to form a 1:4-endomethylene-cyclohexane-2-sulfonic acid halide.

The 1:4-endoalkylene-$\Delta^5$-cyclohexane-2-sulfonic acid amides used as starting materials are obtained, for example, from the corresponding halides by reaction with ammonia or an amine. The halides are accessible by condensing a cycloalkadiene with an $\alpha:\beta$-unsaturated organic sulfonyl halide.

The invention further includes any variant of the process in which an intermediate obtained at any stage of the process is used as starting material and the remaining step or steps is/are carried out, or the process is discontinued at any stage thereof.

The reactions are carried out in the known manner in the presence or absence of diluents and/or condensing agents and/or catalysts, at the ordinary or an elevated temperature, under atmospheric or superatmospheric pressure.

The new compounds described above can be used as medicaments in human and veterinary medicine, for example in the form of pharmaceutical preparations that contain the aforementioned products in admixture with a pharmaceutical organic or inorganic excipient suitable for enteral, parenteral or local administration. Suitable excipients are substances that do not react with the new compounds such, for example, as gelatine, cholesterol, lactose, starch, magnesium stearate, talc, vegetable oils, benzyl alcohols, gums, polyalkylene glycols, white petroleum jelly or other known medicinal excipients. The pharmaceutical preparations may be, for example, tablets, dragees, powders, ointments, creams, suppositories, or in liquid form solutions, suspensions or emulsions. They may be sterilized and/or may contain assistants such as preserving, stabilizing, wetting or emulsifying agents. They may also contain further therapeutically valuable substances.

The invention is illustrated by the following examples without being limited thereto.

*Example 1*

4.6 grams of 1:4-endomethylene-cyclohexane-2-sulfonyl fluoride are treated with 40 cc. of liquid ammonia and a trace of ammonium chloride while being cooled with a mixture of solid carbon dioxide and acetone, then heated in a bomb tube for 20 hours at 90° C., and then cooled. The reaction tube is opened and the reaction mixture left to itself at room temperature until the ammonia has evaporated. The crystalline residue is taken up in chloroform, the chloroform solution is twice washed with water, dried over anhydrous sodium sulfate and the filtered chloroform solution is evaporated to dryness under vacuum, to yield 4.1 grams of crystalline residue melting at 98–101° C. which is recrystallized from isopropanol or water, to yield a mixture of the endo- and the exo-isomer of 1:4-endomethylene-cyclohexane-2-sulfonamide of the formula

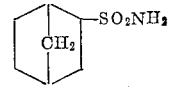

melting at 107–108° C.

The starting material is obtained as follows:

20 cc. of cyclopentadiene are added dropwise with stirring and cooling to 20.9 grams of vinylsulfonyl fluoride in 40 cc. of absolute ether. The clear colorless reaction mixture is then allowed to warm up to room temperature and is then kept for 20 hours, in the beginning with occasional cooling. The solvent is evaporated and the oily residue is distilled under vacuum, to yield after a forerunning of 2.3 grams 28.8 grams of 1:4-endomethylene-$\Delta^5$-cyclohexene-2-sulfonyl fluoride as a colorless oil boiling at 102–106° C. under 15 mm. Hg pressure.

28.8 grams of this substance are hydrogenated in 100 cc. of ethyl acetate as solvent and 1 gram of palladium carbon (10% Pd) as catalyst at room temperature under atmospheric pressure. Within about 50 minutes 1 molecular proportion of hydrogen is absorbed, whereupon the hydrogenation comes to a standstill. The whole is filtered, the solvent is evaporated and the residue is distilled under vacuum to yield 27.6 grams of 1:4-endomethylene-cyclohexane-2-sulfonyl fluoride as a colorless oil boiling at 103–106° C. under 15 mm. Hg pressure which, according to its gas chromatogram with two different stationary phases, is unitary.

Example 2

The crude mixture of the two isomers (endo/exo) of 1:4-endomethylene-cyclohexane-2-sulfonic acid amide of M.P. 98–101° C. is recrystallized from isopropanol (twice the quantity) and water (ten times the quantity) until a product is obtained melting at 132–133° C. whose melting point does not change after further recrystallization. The product is one of the two possible isomers (endo or exo) of 1:4-endomethylene-cyclohexane-2-sulfonic acid amide of the formula

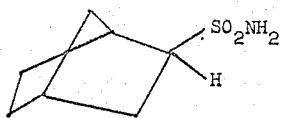

or

Example 3

2.5 grams of 1:4-endomethylene-cyclohexane-2-sulfonyl chloride is stirred dropwise into 100 cc. of liquid ammonia and the solution is then evaporated to dryness. The crystalline residue is distributed between water and chloroform. The chloroform layer yields 1.1 grams of crystals, which after having been recrystallized twice from isopropanol, melt at 108–110° C. and are identical with the 1:4 - endomethylene - cyclohexane - 2 - sulfonamide obtained as described in Example 1.

The starting material may be obtained, for example, as follows:

10 grams of thioacetic acid are stirred dropwise into 10 grams of norbornylene, whereupon a rapid exothermic reaction sets in. The reaction mixture is kept overnight, and the reaction product is then taken up in ether and the solution is washed twice with dilute aqueous sodium bicarbonate solution. The ethereal solution is then dried, filtered and evaporated to dryness. Distillation under vacuum of the residue yields 15.2 grams of thionorborneol acetate boiling at 102° C. under 13 mm. Hg pressure. 7.5 grams of this substance are added at 0° C. to a mixture of 50 cc. of concentrated hydrochloric acid and 25 cc. of water, the whole is stirred for ½ hour and while cooling a solution of 6.0 grams of potassium chlorate in 70 cc. of water is stirred in slowly. The mixture is stirred on overnight, the suspension is treated with 200 cc. of ether which is then separated again and washed twice with water, dried and evaporated. Vacuum distillation of the residue yields 2.5 grams of 1:4-endomethylene-cyclohexane-2-sulfonyl chloride as a colorless oil boiling at 128–129° C. under 13 mm. Hg pressure.

Another method for the preparation of the starting material is as follows:

A mixture of 19 grams of norbornylene, 21 grams of sodium bisulfite and 300 cc. of water is shaken at room temperature for 4 days. The aqueous solution washed twice with ether is evaporated to dryness under reduced pressure to yield 37.5 grams of colorless crystals which, according to analysis, consist to 75% of the sodium salt of norbornyl-2-sulfonic acid. The substance is dried at 100° C. in a high vacuum and is then converted into 1:4-endomethylene-cyclohexane-2-sulfonyl chloride either by reaction with phosphorus oxychloride or with thionyl chloride in dimethylformamide.

Example 4

0.72 gram of 1:4-endomethylene-Δ5-cyclohexene-2-sulfonic acid amide of M.P. 110–112° C. (stereochemically unitary endo or exo form) is hydrogenated in 20 cc. of rectified alcohol with 0.2 gram of palladium carbon of 10% strength as catalyst, 1 mol of hydrogen being taken up. The hydrogenation solution is filtered and evaporated to dryness to yield crystals melting at 131–132° C. which, after having been recrystallized once from 15 cc. of water, melt at 132–133° C. The product is in every respect identical with the compound obtained as described in Example 2.

Example 5

A mixture of 7.4 grams of the 1:4-endomethylene-cyclohexane-2-sulfonyl fluoride described in Example 2 and 30 cc. of isopropylamine is heated in a bomb tube overnight at 100° C., whereupon the reaction mixture is evaporated to dryness under vacuum. The residue is distributed between chloroform and water. After having been dried, filtered and evaporated the organic layer yields 8.5 grams of crystals which on recrystallization from isopropanol yield 6.4 grams of 1:4-endomethylene-cyclohexane-2-sulfonyl-isopropylamide of the formula

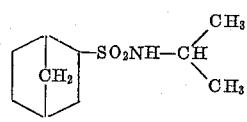

in the form of colorless crystals melting at 91–94° C. In an identical manner, using the corresponding amines, there are obtained:

1:4-endomethylene-cyclohexane - sulfonyl - methylamide, oil of B.P. 119–122° C. under 0.1 mm. of pressure,
1:4-endomethylene - cyclohexane-2-sulfonyl - ethylamide, melting at 50–51° C. (from ether),
1:4-endomethylene-cyclohexane - 2 - sulfonyl - n - butyl-amide, melting at 47–48° C. (from petroleum ether),
1:4-endomethylene-cyclohexane - 2 - sulfonyl-cyclo-hexyl-amide, melting at 104–105° C. (from methanol),
1:4-endomethylene-cyclohexane - 2 - sulfonyl-(1:4-endo-methylene-1:2:3:4-tetrahydro-benzyl)-amide, melting at 125–127° C. (from isopropanol),
1:4-endomethylene-cyclohexane-sulfonyl - -β - phenyleth-ylamide, melting at 61–63° C. (from ether),
1:4-endomethylene-cyclohexane-sulfonyl - dimethylamide, melting at 96–98° C. (from isopropanol),
1:4 - endomethylene - cyclohexane - 2 - sulfonyl - diethyl-amide, oil boiling at 107–109° C. under 0.05 mm. of pressure,
1:4-endomethylene-cyclohexane - 2 - sulfonyl-piperidide, melting at 88–90° C. (from ether).

Example 6

A solution of 1 gram of sodium in 50 cc. of methanol is mixed with 6.2 grams of 1:4-endomethylene-cyclohexane-2-sulfonamide and, while cooling, a solution of 7.5 grams of methiodide in 20 cc. of methanol is stirred in dropwise. The mixture is stirred overnight and then refluxed for one hour. The clear solution is evaporated to dryness. The residue is distributed between water and chloroform and the organic layer is dried and evaporated. Distillation of the residue yields 4.1 grams of 1:4-endomethylene-cyclohexane-2-sulfonyl - methylamide as a colorless oil boiling at 119–122° C. under 0.1 mm. Hg pressure, of the formula

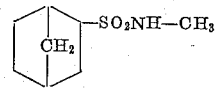

which is identical with the corresponding product obtained as described in Example 5.

Example 7

6.8 grams of 1:4-endomethylene-Δ5-cyclohexene-2-sulfonyl-dimethylamide are hydrogenated in 100 cc. of methanol with 0.5 gram of palladium carbon, 1 molecular proportion of hydrogen being rapidly absorbed. The hydrogenation solution is filtered and evaporated and the resulting crystals are recrystallized 6 times from isopropanol to yield 2.3 grams of 1:4-endomethylene-cyclohexane-2-sulfonyl-dimethylamide, melting at 97–99° C., of the formula

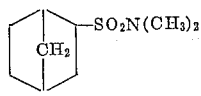

which is identical with the corresponding product obtained as described in Example 5.

When 1:4-endomethylene-Δ⁵-cyclohexene-2-sulfonyl-diethylamide is hydrogenated in identical manner, it yields 1:4-endomethylene-cyclohexane-2-sulfonyl-diethylamide as a colorless oil boiling at 103–104° C. under 0.01 mm. It is in every respect identical with the product corresponding to the same specification, obtained as described in Example 5.

The starting material may be obtained as follows:

A mixture of 26.8 grams of vinylsulfonyl-dimethylamide and 27 cc. of cyclopentadiene is heated in a glass bomb tube overnight at 150° C. The dark suspension is allowed to cool and then flushed out with methanol. The solution is evaporated and the residue distilled to yield 23.2 grams of 1:4-endomethylene-Δ⁵-cyclohexene-2-sulfonyl-dimethylamide of the formula

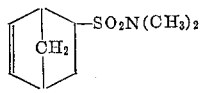

as a slightly yellowish oil boiling at 90–100° C. under 0.04 mm. Hg pressure. It crystallises spontaneously and melts at 54–57° C. after recrystallization from isopropanol.

By reacting vinylsulfonyl-diethylamide with cyclopentadiene as described above there is obtained 1:4-endomethylene-Δ⁵-cyclohexene-2-sulfonyl-diethylamide as a colorless oil boiling at 95° C. under 0.05 mm. Hg pressure.

*Example 8*

17.5 grams of 1:4-endomethylene-cyclohexane-2-sulfonamide are dissolved in 100 cc. of acetic anhydride and 10 cc. of pyridine and refluxed for 3 hours. The solution is then evaporated to dryness under reduced pressure, the residue taken up in chloroform and the solution washed with dilute hydrochloric acid and water, dried, evaporated and crystallized from chloroform to yield 19.5 grams of 1:4-endomethylene-cyclohexane-2-sulfonic acid-N-acetylamide melting at 92–98° C. of the following formula

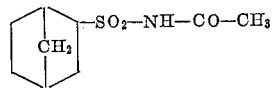

*Example 9*

8.75 grams of 1:4-endomethylene-cyclohexane-2-sulfonamide are dissolved in 30 cc. of absolute pyridine. 7.5 grams of benzoyl chloride are added dropwise to the solution with stirring and cooling, and stirring is continued for 1 hour at room temperature and for two hours at 60–70° C. The solution is then poured into a mixture of chloroform and dilute hydrochloric acid. After washing with hydrochloric acid and water there are obtained from the chloroform 15.0 grams of a highly viscous oil. The latter is dissolved in 60 cc. of N-sodium hydroxide solution. After the reaction solution has been washed twice with ether, the aqueous solution is evaporated to dryness under reduced pressure and the residue recrystallized from alcohol. There is obtained the sodium salt of 1:4-endomethylene-cyclohexane-2-sulfonic acid-N-benzoylamide of the formula

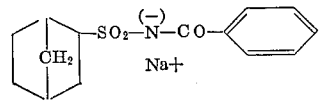

*Example 10*

A solution of 12 grams of 1:4-endomethylene-cyclohexane-2-sulfonamide are dissolved in a mixture of 75 cc. of N-sodium hydroxide solution and 200 cc. of acetone, and a solution of 12.5 grams of n-butylisocyanate in 50 cc. of acetone is stirred in dropwise at room temperature. The mixture is stirred for 2 hours at room temperature and then refluxed for one hour. While still warm the solution is treated with 80 cc. of N-hydrochloric acid and the whole is cooled to −10° C. The precipitated crystals are suctioned off, recrystallized from 60 cc. of isopropanol and yield 5.7 grams of N₁-[1:4-endomethylene-cyclohexane-2-sulfonyl]-N₂-[n-butyl]-urea of the formula

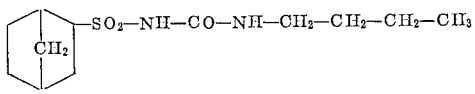

in the form of colorless crystals melting at 148–150° C.

When 1 molecular proportion of aqueous sodium hydroxide solution is added to the above compound, an aqueous solution of its sodium salt (pH=7) is obtained.

*Example 11*

20 grams of 1:4-endoethylene-cyclohexane-2-sulfonyl-fluoride are heated in an autoclave in admixture with 100 grams of ammonia and a trace of ammonium chloride overnight at 100° C. The autoclave is allowed to cool and opened and the reaction mixture is left to itself at room temperature until the ammonia has evaporated. The crystalline residue is taken up in a mixture of chloroform and water. The chloroform layer is dried over sodium sulfate, suction-filtered and evaporated to dryness. The crystalline residue is recrystallized twice from isopropanol and yields 16.4 grams of 1:4-endoethylene-cyclohexane-2-sulfonamide melting at 132–133° C. of the formula

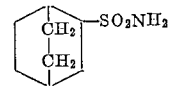

The starting material may be obtained, for example, as follows:

A mixture of 60 grams of vinylsulfonyl fluoride and 46.8 grams of cyclohexadiene is heated for 12 hours at 120° C. in an autoclave. The resulting reaction product is then distilled under vacuum and yields 43.3 grams of 1:4-endoethylene-Δ⁵-cyclohexene-2-sulfonyl fluoride as a colorless oil boiling at 120–124° C. under 13 mm. Hg pressure. 41.2 grams of this compound are hydrogenated in 200 cc. of ethyl acetate with 0.5 gram of palladium carbon as catalyst, 1 molecular proportion of hydrogen being absorbed. The reaction solution is filtered and evaporated to dryness. On distillation, the remaining oil yields 40.5 grams of 1:4-endoethylene-cyclohexane-2-sulfonyl fluoride boiling at 119–121° C. under 12 mm. Hg pressure which, according to its gas chromatogram with two different stationary phases, contains 99.4% of a unitary substance.

*Example 12*

A mixture of 10 grams of the 1:4-endoethylene-cyclohexane-2-sulfonyl fluoride prepared as described in Example 11 and 30 cc. of isopropylamine is heated in a bomb tube overnight at 120° C., allowed to cool and evaporated to dryness. The residue is taken up in chloroform and washed with dilute hydrochloric acid and water; the dried chloroform layer is evaporated to yield 12 grams of a crystalline residue which, after having been recrystallized from isopropanol, yields 10.95 grams of 1:4-endoethylene-cyclohexane-2-sulfonyl-isopropylamide of the formula

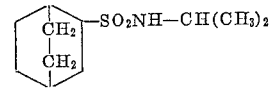

in the form of colorless needles melting at 139–140° C.

When diethylamine is used in the process described above there is obtained 1:4-endoethylene-cyclohexane-2-sulfonyl-diethylamide of the formula

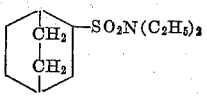

which melts at 39–42° C. on recrystallization from petroleum ether.

*Example 13*

7.5 grams of 1:4 - endomethylene-3-methyl-Δ⁵-cyclohexene-2-sulfonamide are hydrogenated in 100 cc. of methanol with 0.5 gram of palladium carbon, whereby 1 molecular proportion of hydrogen is rapidly absorbed. The filtered hydrogenation solution is evaporated to dryness. After having been recrystallized from ether the crystalline residue yields 4 grams of 1:4-endomethylene-3-methyl-cyclohexane-2-sulfonamide as colorless crystals melting at 78–82° C., of the formula

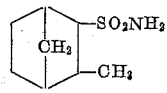

The starting material may be obtained by the process described in my co-pending U.S. patent application Ser. No. 111,922 filed May 23, 1961.

*Example 14*

6 grams of 1:4-endomethylene-3-methyl-Δ⁵-cyclohexene-2-sulfonyl-ethylamide are dissolved in 50 cc. of rectified alcohol and hydrogenated in the presence of 0.5 gram of 10% palladium carbon, exactly 1 mol of hydrogen being taken up. The filtered hydrogenation solution is evaporated and the residue distilled. There are obtained 5.2 grams of 1:4-endomethylene-3-methyl-cyclohexane-2-sulfonyl-ethylamide of the formula

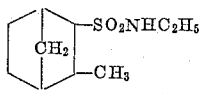

as oil boiling at 115–116° C. under 0.09 mm. of pressure which solidifies on cooling and then melts at 50° C.

The starting material may be obtained by the process described in my co-pending U.S. patent application Ser. No. 111,922 filed May 23, 1961.

*Example 15*

10 grams of 1:4-endomethylene-3-phenyl-Δ⁵-cyclohexene-2-sulfonamide of melting point 159–160° C. (stereochemically unitary) are dissolved in 500 cc. of methanol and hydrogenated in the presence of 1 gram of 10% palladium carbon, 1 mol of hydrogen being rapidly taken up. The filtered hydrogenation solution is evaporated to dryness and yields an oil which crystallizes from isopropanol. There are obtained 7.9 grams of 1:4-endomethyl-3-phenyl-cyclohexane-2-sulfonamide melting at 99–100° C. of the formula

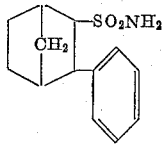

In an identical manner there are obtained by hydrogenating the corresponding Δ⁵-cyclohexene derivatives:
1:4 - endomethylene - 3 - phenyl - cyclohexane - 2 - sulfonyl-ethyl-amide, melting at 82–84° C. (from ether),
1:4 - endomethylene - 3 - phenyl - cyclohexane - 2 - sulfonyl-diethyl-amide, melting at 101–103° C. (from ether).

The starting materials may be obtained by the process described in my co-pending U.S. patent application Ser. No. 111,922 filed May 23, 1961.

*Example 16*

50 cc. of absolute pyridine are added to 6.6 grams of 1:4 - endomethylene - 3- phenyl - cyclohexane - 2 - sulfonamide, and 3.8 grams of benzoyl chloride are added to the resulting solution with stirring and cooling. The clear reaction mixture is stirred for 1 hour at room temperature and for 2 hours at 60–70° C. The reaction mixture is dissolved in chloroform, the solution washed with hydrochloric acid and water, dried and evaporated to yield 9.6 grams of crystals which are recrystallized from methanol. The resulting 1:4-endomethylene-3-phenyl-cyclohexane-2-sulfonyl-N-benzoylamide melts at 196–198° C. and corresponds to the formula

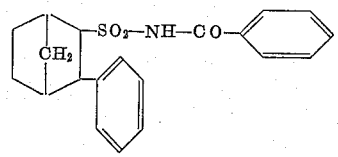

*Example 17*

A solution of 5.2 grams of 1:4-endomethylene-3-methyl-Δ⁵-cyclohexene-2-sulfonamide in 100 cc. of ether is treated with 150 cc. of a 0.21N-ethereal monoperphthalic acid solution. The mixture is kept at room temperature, whereupon a copious crystalline precipitate is obtained. After one week the ether is decanted, the precipitated crystals are distributed between chloroform and aqueous sodium bicarbonate and the chloroform layer yields 0.8 gram of crystals which can be recrystallized from isopropanol, to yield one of the possible isomers of 1:4-endomethylene-3-methyl-5:6-oxido-cyclo-hexane-2-sulfonamide, melting at 133–135° C., of the formula

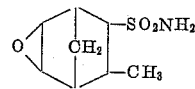

From the filtrate of the ethereal reaction solution there may be obtained after washing with sodium bicarbonate, drying and evaporation, a second isomer of the same formula melting at 145° C.

*Example 18*

A mixture of 17.3 grams of 1:4-endomethylene-Δ⁵-cyclohexene-2-sulfonyl-diethylamide and a small excess of ethereal monoperphthalic acid is kept for 5 days at room temperature. The ethereal solution is decanted from the precipitated crystals (phthalic acid), washed with aqueous ferrous sulfate solution, then with aqueous sodium bicarbonate solution and finally with water, and dried over sodium sulfate. The ethereal solution is filtered and evaporated and yields a colorless oil which is distilled in high vacuum, to yield 15.5 grams of 1:4-endomethylene-5:6-oxido-cyclohexane-2-sulfonyl diethylamide as an oil boiling at 126–128° C. under 0.1 mm. Hg pressure, of the formula

*Example 19*

9.9 grams of 1:4-endomethylene-3-phenyl-Δ⁵-cyclohexene-2-sulfonamide are treated with 500 cc. of 0.110N-ethereal monoperphthalic acid solution and allowed to stand at room temperature. After one month the reaction mixture is cooled to −10° C. and then suction-filtered. The residue (about 25 grams) is treated with chloroform and aqueous sodium bicarbonate, stirred for some time and any undissolved material separated. The latter is recrystallized from ample methanol and yields 1:4 - endomethylene - 3 - phenyl - 5:6 - oxido - cyclohexane-2-sulfonamide which slowly decomposes from 180° C. upwards. The product corresponds to the formula

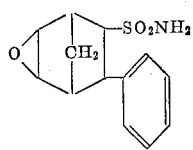

What is claimed is:
1. A member selected from the group consisting of a compound of the formula

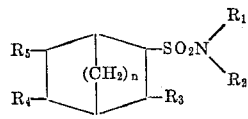

wherein $n$ is an integer from 1 to 2, the group $R_1$ is a member selected from the group consisting of hydrogen, lower alkyl, cyclohexyl, phenyl-ethyl, lower alkanoyl, benzoyl, carbamoyl, N-lower alkyl-carbamoyl, the group $R_2$ is a member selected from the group consisting of hydrogen, lower alkyl, cyclohexyl, phenyl-ethyl and $R_1$ together with $R_2$ is piperdino, the group $R_3$ stands for a member selected from the group consisting of hydrogen, lower alkyl and phenyl, and $R_4$ and $R_5$ each is a member selected from the group consisting of hydrogen and together the oxido group, and alkali metal salts of said compounds wherein $R_1$ and $R_2$ are hydrogen.

2. 1:4-endomethylene-cyclohexane-2-sulfonamide.
3. 1:4-endoethylene-cyclohexane-2-sulfonamide.
4. N-mono-lower alkyl - 1:4 - endomethylene-cyclohexane-2-sulfonamide.
5. N - methyl - 1:4 - endomethylene - cyclohexane - 2-sulfonamide.
6. N-ethyl - 1:4 - endomethylene - cyclohexane - 2-sulfonamide.
7. 1:4 - endomethylene - 3 - lower alkyl - cyclohexane-2-sulfonamide.
8. 1:4 - endomethylene - 3 - methyl - cyclohexane - 2-sulfonamide.
9. 1:4 - endoethylene - 3 - lower alkyl - cyclohexane-2-sulfonamide.
10. 1:4 - endomethylene - 3 - phenyl - cyclohexane - 2-sulfonamide.
11. 1:4 - endomethylene - 5:6 - oxido - cyclohexane - 2-sulfonamide.
12. 1:4 - endoethylene - 5:6 - oxido - cyclohexane - 2-sulfonamide.

References Cited in the file of this patent
Borsche et al.: Chemische Berichte, vol. 39, pp. 2346–2350 (1906).